(12) United States Patent
Sick et al.

(10) Patent No.: US 12,134,687 B2
(45) Date of Patent: Nov. 5, 2024

(54) ARTIFICIAL TURF FIBER WITH UV PROTECTION SUBSTANCES

(71) Applicant: Polytex Sportbelage Produktions-GmbH, Grefrath (DE)

(72) Inventors: Stephan Sick, Willich (DE); Dirk Sander, Kerken (DE); Dirk Schmitz, Weeze (DE); Bernd Jansen, Nettetal (DE); Ivo Lohr, Kempen (DE)

(73) Assignee: Polytex Sportbeläge Produktions-GMBH, Grefrath (DE)

( * ) Notice: Subject to any disclaimer, the term of this patent is extended or adjusted under 35 U.S.C. 154(b) by 920 days.

(21) Appl. No.: 16/976,878

(22) PCT Filed: Feb. 11, 2019

(86) PCT No.: PCT/EP2019/053222
§ 371 (c)(1),
(2) Date: Aug. 31, 2020

(87) PCT Pub. No.: WO2019/170365
PCT Pub. Date: Sep. 12, 2019

(65) Prior Publication Data
US 2020/0407533 A1 Dec. 31, 2020

(30) Foreign Application Priority Data
Mar. 9, 2018 (EP) .................... 18161114

(51) Int. Cl.
*C08K 5/00* (2006.01)
*C08J 3/22* (2006.01)
(Continued)

(52) U.S. Cl.
CPC ............... *C08K 5/005* (2013.01); *C08J 3/226* (2013.01); *C08K 5/134* (2013.01); *C08K 5/17* (2013.01);
(Continued)

(58) Field of Classification Search
CPC .......... C08K 5/005; C08K 5/17; C08K 5/134; C08K 5/524; C08J 3/226; C08J 2323/06;
(Continued)

(56) References Cited

U.S. PATENT DOCUMENTS

2002/0040081 A1   4/2002   Stein et al.
2002/0169239 A1   11/2002  Wood et al.
(Continued)

FOREIGN PATENT DOCUMENTS

EP   0429731 A1   6/1991
EP   1833907 B1   10/2008
(Continued)

OTHER PUBLICATIONS

International Preliminary Report on Patentability dated Sep. 15, 2020, issued in corresponding Application No. PCT/EP/2019/053222.
(Continued)

*Primary Examiner* — Bijan Ahvazi
(74) *Attorney, Agent, or Firm* — Harness, Dickey & Pierce, P.L.C.

(57) ABSTRACT

The invention relates to a polymer-based artificial turf fiber comprising substances (216) adapted for protecting the fiber against UV radiation. The substances comprise a hindered amine light stabilizer—HALS and a first and a second UV-absorbent substance. The molecular weights of the first and the second UV-absorbent substances differ from each other by at least 100 g/mol.

14 Claims, 2 Drawing Sheets

(51) Int. Cl.

| | |
|---|---|
| *C08K 5/134* | (2006.01) |
| *C08K 5/17* | (2006.01) |
| *C08K 5/524* | (2006.01) |
| *D01D 5/42* | (2006.01) |
| *D01F 1/10* | (2006.01) |
| *D01F 6/46* | (2006.01) |
| *D01F 6/90* | (2006.01) |
| *E01C 13/08* | (2006.01) |

(52) U.S. Cl.
CPC .............. *C08K 5/524* (2013.01); *D01D 5/426* (2013.01); *D01F 1/106* (2013.01); *D01F 6/46* (2013.01); *D01F 6/90* (2013.01); *E01C 13/08* (2013.01); *C08J 2323/06* (2013.01); *C08J 2377/00* (2013.01); *C08J 2400/22* (2013.01)

(58) Field of Classification Search
CPC ... C08J 2400/22; C08J 2377/00; D01F 1/106; D01F 6/46; D01F 6/90; D01D 5/426; E01C 13/08
See application file for complete search history.

(56) References Cited

U.S. PATENT DOCUMENTS

| | | | |
|---|---|---|---|
| 2004/0030009 A1* | 2/2004 | Gugumus | C08K 5/3475 524/86 |
| 2004/0229977 A1 | 11/2004 | Watson et al. | |
| 2013/0092281 A1 | 4/2013 | Sutton et al. | |
| 2013/0273268 A1* | 10/2013 | Luijkx | D01D 5/426 428/17 |

FOREIGN PATENT DOCUMENTS

| | | |
|---|---|---|
| KR | 101009390 B1 | 1/2011 |
| KR | 101723817 B1 | 4/2017 |
| WO | WO-2008/083975 A1 | 7/2008 |

OTHER PUBLICATIONS

European Office Action dated Sep. 24, 2021 issued in corresponding European Appln. No. 19702925.9.
International Search Report PCT/ISA/210 for International Application No. PCT/EP2019/053222 dated Mar. 22, 2019.
Written Opinion of the International Searching Authority PCT/ISA/237 for International Application No. PCT/EP2019/053222 dated Mar. 22, 2019.
Database WPI Week 201120 Thomson Scientific, London, GB: An 2011-B11702 XP002784066.
Search Report for European Application No. 23173196.9 dated Sep. 22, 2023.
Notice of Opposition dated Aug. 13, 2024 issued in European patent application No. 19702925.9.
Wikipedia, "Alterungsschutzmittel," Feb. 7, 2017, [cited Aug. 8, 2024].
Wikipedia, "Sebacinsaure-bis(2,2,6,6-tetramethyl-4-piperidyl)ester," May 25, 2017, [cited Aug. 8, 2024].
Pauquet, Jean-Roch, "Antioxidantien," KU Kunststoffe, Jul. 31, 1999.
BASF, "Flamestab NOR 116," Sep. 30, 2015, [cited Aug. 8, 2024].
Produktionsprotokoll fur Masterbach Deltacolor 3708-UV.
Produktionsprotokoll uber Kunstrasengarn-Charge 671908L, charge 22.
Rechnung und Lieferschein fur Kunstrasengarn 671908L, charge 22.
Lumitos AG, "Lichtschutzmittel Uvinul 5050H erhalt Zulassung," Mar. 31, 2005, [cited Aug. 8, 2024].

* cited by examiner

ARTIFICIAL TURF FIBER WITH UV PROTECTION SUBSTANCES

This application is a national phase under 35 U.S.C. § 371 of PCT International Application No. PCT/EP2019/053222 which has an International filing date of Feb. 11, 2019, which claims priority to European Application No. 18161114.6, filed Mar. 9, 2018, the entire contents of each of which are hereby incorporated by reference.

FIELD OF THE INVENTION

The invention relates to UV protection of artificial turf polymers, in particular artificial turf fibers.

BACKGROUND AND RELATED ART

Artificial turf or artificial grass is a surface that is made up of fibers, which is used to replace grass. The structure of the artificial turf is designed such that the artificial turf has an appearance which resembles grass. Typically artificial turf is used as a surface for sports such as soccer, American football, rugby, tennis, golf, for playing fields, or exercise fields. Furthermore artificial turf is frequently used for landscaping applications.

An advantage of using artificial turf is that it eliminates the need to care for a grass playing or landscaping surface, like regular mowing, scarifying, fertilizing and watering. Watering can be difficult due to regional restrictions for water usage. In other climatic zones the re-growing of grass and re-formation of a closed grass cover is slow due to the damaging of the natural grass surface by playing and/or exercising on the field. Artificial turf fields, though they do not require similar attention and effort to be maintained, may require some maintenance such as having to be cleaned from dirt and debris and having to be brushed regularly. This may be done to help fibers stand up after being pressed down during the play or exercise. Throughout the typical 5-to-15-year lifetime, an artificial turf sports field is exposed to high mechanical wear, UV light, thermal aging, as well as chemicals and various environmental conditions.

Over time, exposure to the UV radiation in sunlight will degrade plastics. Polymer photodegradation occurs when non-visible UV radiation made up of short wave lengths breaks down the polymer chains in plastics. This process results in the deterioration of physical properties such as loss of impact strength, changes in color, cracking, loss of elongation and tensile strength or chalking of the surface. For example, polyethylene fibers lose their gloss and become brittle and the color of the fibers may change and appear chalky.

UV radiation ranges between 280 and 400 nm, but the most aggressive part of the UV range is the very short wavelengths between 280 and 315 nanometers. The amount of radiation energy exposure (irradiation) depends on where in the world the polymer material, e.g. a sports field made of artificial turf, is located. For example, the amount of energy transmitted to a plastic part in one year of continuous outdoor use is 220 kcal/cm2/year in countries close to the equator like Sudan while for countries as far away from the equator like Sweden it is 70 kcal/cm2/year. Polymers are sensitive to certain wavelengths within the 290-400 nm UV region. For example, polypropylene has three maxima at 290-300, 330 and 370 nm. Polymer photodegradation occurs when UV light from the sun is absorbed by chemical groups ("chromophores") in the polymer.

Using light stabilizers in the context of artificial turf as such is known. For example, international patent application WO/2008/083975 describes a light-stabilized composition suitable for various outdoor applications, including artificial turf. However, many light stabilizers currently used in this context do not provide long-term light protection over many years as desired in the context of artificial turf.

US 20040030009A1 describes a polyolefin composition which comprises d) at least one organic pigment e) at least one sterically hindered amine light stabilizer and f) as UV absorber a mixture of a 2-hydroxyphenyl benzotriazole and a 2-hydroxyphenyl-s-triazine. The document further describes a method for stabilizing pigmented polyolefins and the use of a UV-absorber mixture of a hydroxyphenyl benzotriazole with a hydroxyphenyl-s-triazine for the stabilization of pigmented polyolefins.

DATABASE WPI Week 201120 Thomson Scientific, London, GB; AN 2011-611702-& D2' KR 101 009390 B1 (KOLONGLOTECH INC) 19 Jan. 2011 describes a polyolefin fiber comprising polyolefin resin, hindered amine light stabilizer—(HALS)-triazine type flame retardant, coloring agent, photo stabilizer, UV-absorbing agent and antioxidant.

US 20130273268A1 describes an artificial grass tufted from slit film or monofilaments which are prepared with a polyethylene prepared with a bistetrahydroindenyl or bisindenyl metallocene catalyst complex.

SUMMARY

The invention provides an artificial turf fiber, artificial turf comprising the artificial turf fiber and a method of manufacturing the same as specified in the independent claims. Embodiments are given in the dependent claims. Embodiments and examples described herein can be freely combined with each other if they are not mutually exclusive.

In one aspect the invention relates to a polymer-based artificial turf fiber comprising substances adapted for protecting the fiber against UV radiation. The substances comprise a hindered amine light stabilizer—HALS, a first UV-absorbent substance and a second UV-absorbent substance. The molecular weights of the first and the second UV-absorbent substances differ from each other by at least 100 g/mol.

It has been shown that the light stabilizing effect provided by conventional light stabilizers used in the context of artificial turf often lasts only for a limited time. In contrast to many other plastics materials comprising light stabilizers such as, for example, plastics-based furniture, artificial turf fibers have a very small diameter and a large surface-to-mass ratio. It has been observed that light stabilizing substances tend to leave the fiber material. Artificial turf fibers sometimes are used in combination with other plastics which comprise plasticizers and softeners, e.g. oils. For example, artificial turf may comprise a fill layer with rubber granules which may comprise some vegetable or petro-based oils which increase the softness and elasticity of the rubber granules. Applicant has observed that the plasticizers tend to leave these plastics and enter the artificial turf fibers, thereby increasing the mobility and migration speed of the light stabilizers and reducing the duration of the UV stabilizing effect of state of the art light stabilizers, if any. Thus, the effect provided by many currently used light stabilizers tends to be short-lasting if used as a component of an artificial turf fiber, in particular if the fiber is mixed with and contacts any other plastics with a plasticizer.

Using multiple UV-protection substances comprising a HALS may be advantageous as HALSs have been observed to be particularly potent light stabilizers and to be able to inhibit the UV-induced photodegradation processes. Using a HALS as a component of the UV protection mixture may be beneficial as HALS may act as long-term thermal stabilizer that traps free radicals formed during the photo-oxidation of a plastic material, thereby limiting the photodegradation process. The ability of HALSs to scavenge radicals created by UV absorption is explained by the formation of nitroxly radicals through the "Denisov Cycle". Although there are wide structural differences in the HALS products commercially available, all HALSs share the 2,2,6,6-tetramethylpiperidine ring structure. Applicant has observed that HALSs are adapted to effectively act as UV stabilizers of a wide range of polymers, in particular polyethylene, polypropylene, polyamide and polyurethane. Thus, applicant has observed that HALS UV stabilizers are particularly suited for protecting plastics typically used for producing artificial turf fibers and backings from photodegradation. According to embodiments, the artificial turf fiber is made of polyethylene (PE), polypropylene (PP), polyamide (PA) or a mixture thereof.

Using UV-absorbent substances in combination with a HALS may be beneficial as the UV-protective effect is increased: while HALS reduces the effect of already created free radicals, the UV-absorbent substances may reduce the generation of such radicals from the beginning. It has been observed that a combination of one or more HALSs and of one or more UV-absorbent substances thus provides a particularly effective protection against UV-induced polymer degradation.

Using two UV-absorbent substances with significantly different weight has been observed to be particularly advantageous as the long-term protective effect of the substances as well as the number of polymer types that can be protected by the "UV protection substances", also referred to as "UV protection substance mixture" is increased: often, polymer mixtures used for creating artificial turf fibers or rubber granules in the infill layer (typically contained in "$3^{rd}$ generation turf") which are in contact with the fibers comprise various additives like flowing agents, oils, softeners, and the like. The presence of a particular softener or similar substance may allow other substances to migrate within the polymer material or even to leave the polymer material. Thus, after some years, in particular substances with low molecular weight may have left the polymer material completely. If only a low molecular weight absorbent is included in the UV-protection substance mixture, applicant observed that at least for some polymer compositions, the protective effect of this UV-absorbent substance is lost due to migration of the UV-absorbent out of the polymer material. Providing a combination of a low-molecular weight and a high molecular weight UV-absorbent may have the advantage that the high-molecular weight UV-absorbent is typically quite immobile and thus remains in the polymer material for a significantly longer time. In case the high molecular weight UV-absorbent should have left the polymer material after several years, or are destroyed by the sun-light or other factors, the low-molecular weight absorbent, which is comparatively mobile, may migrate from inner regions of the polymer material to the surface, thereby continuously replenishing the amount of high and/or low molecular weight UV-absorbent substances having left the polymer material via the surface or having been degraded at the surface of the polymer material due to various environmental factors. Thus, a substance mixture may be provided that is adapted to provide a long-term protection for a wide range of different polymer types. Migration effects induced by various polymer additives, in particular softeners, may be reduced by adding the high-molecular weight UV-absorbent substance to the UV protection substance mixture, and any loss of the high-molecular weight UV-absorbent substance at the surface of the material due to migration or chemical degradation may be compensated by the comparatively mobile low-molecular weight UV-absorbent substance which may continually migrate from inner parts of the polymer material to the surface along a concentration gradient of the low- and/or high-molecular weight UV-absorbent substances. It has been observed that the combination of the HALS with two UV-absorbing substances of significantly different weights may have a synergistic effect in respect to the durability of the light stabilizing effect, because a combination of said substances provides for a significantly longer light protective effect than expected based on a simple summation of the individual effects of the HALS and the two UV-absorbent substances.

A "polymer-based artificial turf fiber" according to some embodiments of the invention is a fiber that basically consists of one or more polymers, in particular polyolefins. For example, an artificial turf can comprise more than 80%, preferably more than 90% of its weight the polymer. According to embodiments of the invention, the polymer of the artificial turf fiber is a polyolefin.

HALS

According to embodiments, the HALS is an N-methyl-HALS, i.e, a HALS comprising at least one nitrogen atom in the cyclohexyl-ring.

According to embodiments, the HALS consists of 1,6-Hexanediamine, N,N'-bis(2,2,6,6-tetramethyl-4-piperidinyl)-, polymers with morpholine-2,4,6-trichloro-1,3,5-triazine. For example, this HALS type is available as "Cyasorb UV-3529" of CYTEC Industries Inc (CAS NUMBER 193098-40-7).

According to alternative embodiments, the HALS consists of 1,3-propanediamine, N,N-1,2-ethanediylbis-, reaction products with cyclohexane and peroxidized N-butyl-2,2,6,6-tetramethyl-4-piperidinamine-2,4,6-trichloro-1,3,5-triazine reaction products.

First and Second UV-Absorbent Substances

According to embodiments, the first and/or the second UV-absorbent substance is adapted to protect the polymer material against thermo-oxidative degradation.

This may be particularly beneficial in the context of using a polymer material that is generated or processed in an extrusion process. Extrusion processes are typically performed at high temperatures above 100° C., thereby subjecting the—typically thermosensitive—polymer material to a significant heat stress that may already damage the material before it is exposed to UV light. Using UV-absorbents that have in addition a protective effect against thermo-oxidation may thus be particularly suited for use in the context of extruded materials, e.g. artificial turf fibers generated in an extrusion process. For example, polymer fibers can be generated as extruded monofilaments or can be generated by slicing an extruded polymer film into stripes that are used as artificial turf fibers.

UV absorbers may have the benefit of low cost but often have a limited lifetime. Thus, the UV-absorbents contained at the surface of a polymer material may alone not provide sufficient long term protection of the polymer. However, by combining at least two UV-absorbents of two different molecular weights and different mobility may allow substituting any degraded or emigrated UV-absorber at the surface of the polymer material by new UV-absorbent molecules migrating from the inner to the outer regions of the polymer material.

According to embodiments, the first and/or the second UV-absorbent substance is an antioxidant.

First UV-Absorbent Substance

According to embodiments, the first UV-absorbent substance has a molecular weight smaller than 800 g/mol.

According to embodiments, the first UV-absorbent substance has a molecular weight smaller than 700 g/mol.

According to preferred embodiments, the first UV-absorbent substance has a molecular weight smaller than 600 g/mol.

According to embodiments, the first UV-absorbent substance is a sterically hindered phenolic antioxidant, in particular Octadecyl-3-(3,5-di-tert.butyl-4-hydroxyphenyl)-propionate. This substance is commercially available e.g. as "IRGANOX 1076" and has a molecular weight of 531 g/mol)

Using a sterically hindered phenolic antioxidant may be advantageous as said substances are highly effective, non discoloring stabilizers for organic substrates such as plastics, synthetic fibers, and elastomers. Sterically hindered phenolic antioxidants may in addition protect the polymer material from thermo-oxidative degradation.

Furthermore, Octadecyl-3-(3,5-di-tert.butyl-4-hydroxyphenyl)-propionate is stable to light and shows good compatibility with most substrates. It shows low volatility and high resistance to extraction.

Second UV-Absorbent Substance

According to embodiments, the second UV-absorbent substance has a molecular weight higher than 800 g/mol.

According to embodiments, the second UV-absorbent substance has a molecular weight higher than 900 g/mol.

According to preferred embodiments, the second UV-absorbent substance has a molecular weight higher than 1000 g/mol.

According to embodiments, the second UV-absorbent substance is a sterically hindered phenolic antioxidant, in particular pentaerythritol tetrakis(3-(3,5-di-tert-butyl-4-hydroxyphenyl)propionate). Said substance has assigned the CAS Number 6683-19-8 and is commercially available as "IRGANOX 1010".

Using a sterically hindered phenolic antioxidant may be advantageous as said substances are highly effective, non discoloring stabilizers for organic substrates such as plastics, synthetic fibers, and elastomers. Sterically hindered phenolic antioxidants may in addition protect the polymer material from thermo-oxidative degradation.

Organophosphite Antioxidant

According to embodiments, the UV-protection substances further comprises an organophosphite antioxidant.

Adding an organophosphite antioxidant to the UV-protection substances may be advantageous as this substance acts as oxygen scavenger and is adapted to protect the polymer material against thermo-oxidative degradation.

According to embodiments, the organophosphite antioxidant is Tris(2,4-ditert-butylphenyl)phosphate (CAS number 31570-04-4).

Using said organophosphite may be advantageous as it is an organophosphite of low volatility and is particularly resistant to hydrolysis. It protects polymers which are prone to oxidation, during an extrusion process from molecular weight change (e.g. chain scission/crosslinking) and prevents discoloration. In a further beneficial aspect, said substance may increase the storage stability of the polymer material comprising the UV-protection substances and give the polymer long term protection against thermo-oxidative degradation. Organophosphite antioxidants have been observed to react during extrusion processes with hydroperoxides formed by autoxidation of polymers, thereby preventing extrusion-induced degradation and extending the performance of the first and second UV-absorbent substances.

Compositions

According to embodiments, the artificial turf fiber comprise 0.4%, more preferably at least 0.6%, more preferably at least 0.8% by its weight the HALS.

In addition, or alternatively, the artificial turf fiber comprises at least 0.05%, more preferably at least 0.1%, more preferably at least 0.2% by its weight the first UV-absorbent substance.

In addition, or alternatively, the artificial turf fiber comprises at least 0.01%, more preferably at least 0.05%, more preferably at least 0.15% by its weight the second UV-absorbent substance.

In addition, or alternatively, the artificial turf fiber comprises at least 0.01%, more preferably at least 0.05%, more preferably at least 0.15% by its weight the organophosphite antioxidant.

According to embodiments, the molecular weights of the first and the second UV-absorbent substances differ from each other by at least 200 g/mol.

According to embodiments, the molecular weights of the first and the second UV-absorbent substances differ from each other by at least 300 g/mol.

According to embodiments, the molecular weights of the first and the second UV-absorbent substances differ from each other by at least 400 g/mol.

According to embodiments, the molecular weights of the first and the second UV-absorbent substances differ from each other by at least 500 g/mol.

According to embodiments, the molecular weights of the first and the second UV-absorbent substances differ from each other by at least 600 g/mol.

Various Embodiments

According to embodiments, the polymer-based fiber material comprises or consists of polyethylene (PE), polypropylene (PP), or polyamide (PA), or a mixture thereof.

According to embodiments, the fiber comprises a booster of photocatalytic degradation of the polymer material of the fiber. The term "photocatalytic degradation" relates to the degradation of material that is triggered and/or boosted by UV radiation.

For example, the booster can be a metal salt or metal oxide, in particular $TiO_2$. $TiO_2$ is commonly used as white pigment in various types of polymer materials, including artificial turf fibers. Titanium dioxide efficiently scatters visible light, thereby imparting whiteness, brightness, and opacity when incorporated into a plastic product. It is chemically inert, insoluble in polymers, and heat stable under the harshest of processing conditions. Titanium dioxide is commercially available in two crystal forms—anatase and rutile. The rutile pigments are preferred over anatase pigments, because they scatter light more efficiently, are more stable, and are less likely to catalyze photo degradation. Applicant has observed that also the rutile TiO2 pigments impose a significant photocatalytic degradation of artificial turf fibers comprising TiO2 and that white artificial turf fibers have an increased susceptibility to UV degradation. However, by adding the UV-protection substances to the polymer material used for creating the fibers, it was possible to stabilize also white fibers, thereby providing artificial turf that partially or completely comprises white fibers having a similar life time like other fibers being free of TiO2 and similar boosters of photocatalytic degradation.

According to embodiments, the booster is contained in the polymer material in the form of emulsified or suspended spherical objects. The objects can be coated with transition-metal-oxides or silicon for reducing the capability of this pigment to boost photocatalytic degradation of the polymer. According to one example, TiO2 rutile particles (having e.g. a size of 30 nm) can be coated with silicon and aluminum. For example, the "white pigment" in the polymer material can consist by at least 90% by weight of TiO2 and of about 6.0-7.5 wt % Si and Al, whereby the surface of the TiO2 particles is coated with silicon and aluminum.

According to some embodiments the TiO2 particles are silanized TiO2 particles.

According to embodiments, the polymer material of the artificial fiber is PE, PA, PP, or a mixture thereof.

In a further aspect, the invention relates to an artificial turf comprising the artificial turf fiber or a plurality of the above described artificial turf fibers.

According to embodiments, the artificial turf comprises rubber infill, e.g. EPDM or SBS rubber. The rubber comprises a plasticizer, e.g. one or more oils.

According to embodiments, the artificial turf comprises first artificial turf fibers comprising a UV-protection substance mixture as described herein for embodiments of the invention, whereby the first artificial turf fibers further comprise a booster of photocatalytic degradation. The booster of photocatalytic degradation is a first pigment having a white or bright color. For example, the first pigment can be TiO2.

The artificial turf in addition comprises second artificial turf fibers and/or third artificial turf fibers. Second artificial turf fibers are turf fibers that are free of the first pigment and comprise at least 10% less of each of the UV-protection substances than the first artificial turf fibers. For example, the second artificial turf fibers can comprise green and/or blue pigments or other pigments which do not boost photocatalytic degradation of the polymer of the fiber and can comprise less than 50%, or less than 40%, or less than 30% of the amount of each of the UV-protection substances contained in the first fibers.

The third artificial turf fibers are artificial turf fibers which are free of the first pigment and are completely free of one or more or all of the UV-protection substances contained in the first fibers. For example, the third fibers can merely comprise the HALS or other components of the UV-protection mixture individually or can be free of any of said UV protection substances. The "third fibers" can also be considered as a sub-group of the second fibers.

Combining first fibers with second and/or third fibers can be advantageous, because by adding a greater amount of the UV protection substances to fibers comprising a booster of photocatalytic degradation such as TiO2, an artificial turf can be created that comprises a mixture of fibers of different colors which nevertheless have a similar or identical lifetime. Thus, a mixed-fiber artificial turf may be provided with homogeneous properties in respect to UV resistance and life expectancy.

In a further aspect, described herein is a method of producing a substance mixture adapted for protecting a polymer material against UV radiation, wherein the substance mixture is in particular suited for protecting polymer based artificial turf fibers, in particular polyolefin based artificial turf fibers. The method comprises mixing a hindered amine light stabilizer—HALS, a first UV-absorbent substance and a second UV-absorbent substance. The molecular weights of the first and the second UV-absorbent substances differing from each other by at least 100 g/mol. Preferably, the UV-protection mixture further comprises an organophosphite antioxidant.

In a further aspect, the invention relates to a method of producing an artificial turf fiber. The method comprises creating a polymer mixture. The creation comprises mixing a polymer and a substance mixture adapted for protecting a polymer-based artificial turf fiber against UV radiation as described herein for embodiments of the invention. The method further comprises extruding the polymer mixture into a polymer film or into a monofilament and processing the film or the monofilament such that the monofilament or film is transformed into the artificial turf fiber. In some embodiments, the processing comprises generating a fibrillated tape from the film or from the monofilament and using the fibrillated tape as the artificial turf fiber.

According to embodiments, the processing comprises transforming the monofilament or the film into fibrillated tape.

According to embodiments, the method further comprises integrating the artificial turf fibers according to any one of the embodiments and examples described herein into a carrier.

According to embodiments, the method further comprises adding an infill layer, the infill layer comprising rubber infill granules positioned in-between the artificial turf fibers, the rubber comprising a plasticizer.

According to embodiments, the method further comprises integrating first artificial turf fibers according to any one of the embodiments and examples described herein in the carrier, the first artificial turf fibers comprising the substances adapted for protecting the fibers against UV radiation and comprising a booster of photocatalytic degradation, the booster of photocatalytic degradation being a first pigment having a white or bright color; and integrating second artificial turf fibers and/or third artificial turf fibers in the carrier. The second artificial turf fibers are free of the first pigment, the second artificial turf fibers comprise at least 10% less of each of the substances than the first fibers. The third artificial turf fibers are free of the first pigment and are free of one or more or all of the substances.

According to embodiments, the artificial turf fibers are textured, e.g. are generated from fibrillated tape or textured monofilaments. Using the UV protection mixture in the context of texturized artificial turf fibers may be particularly advantageous as the surface-to-mass ratio and the contact area with rubber infill granules, if any, is particularly high in textured fibers.

According to embodiments, the creation of the polymer mixture further comprises intermixing an organophosphite antioxidant in the polymer mixture.

According to embodiments, the polymer mixture is extruded into a monofilament. The method further comprises: quenching the monofilament; reheating the monofilament; stretching the reheated monofilament; and forming the monofilament into an artificial turf fiber.

According to alternative embodiments, the polymer mixture is extruded into a film. The method further comprises: transforming the film into a fibrillated tape and forming the fibrillated tape into the artificial turf fiber. A fibrillated film or tape is one that has been processed so that its structure includes fine short fibres, or fibrils, and corresponding holes. Polymer films can be fibrillated either by special cutters and pins, or by more sophisticated methods involving the stretching of the film to cause it to split into multiple localized ruptures.

According to embodiments, the generation of the artificial turf comprises incorporating the artificial turf fiber or a mixture of multiple first and second and optionally further fibers into a carrier, e.g. a carrier mesh or a mesh generated by interweaving the artificial turf fibers. Optionally, a liquid secondary backing can be added to the lower side of the artificial turf for firmly fixing the fibers in the carrier and the artificial turf backing. The artificial turf backing can be a latex layer or a PU layer.

According to embodiments, the method of generating artificial turf further comprises adding an infill layer. The infill layer comprises rubber infill granules positioned in-between the artificial turf fibers. The rubber comprises a plasticizer, e.g. oil. The infill may further comprise sand.

According to embodiments, the method of generating artificial turf further comprises integrating first artificial turf fibers in the carrier and integrating second and/or third artificial turf fibers in the carrier. The second artificial turf fibers are free of the first pigment and comprise at least 10% less of each of the UV-protection substances than the first fibers (in % by weight).

The first artificial turf fibers comprise the substance mixture adapted for protecting the fibers against UV radiation and comprise a booster of photocatalytic degradation. The booster of photocatalytic degradation is a first pigment having a white or bright color, e.g. $TiO_2$. The third artificial turf fibers are free of the first pigment and are free of one or more or of all of the UV-protection substances.

According to some example embodiments, the 'UV-protection substance mixture' is added to a 'master batch,' or to a so-called 'compound batch'.

If the UV-protection substances are added to the master batch, the concentration is chosen such that when the desired amount of masterbatch is mixed with the compound polyol, e.g. PE or a PE/PA mixture, and extruded, the extrusion product comprises the desired amounts of the respective UV-protection substances.

According to some embodiments, the master batch is homogeneously mixed with the compound polyol such that about 6-12% by weight of the final extrusion product (e.g. a monofilament to be used as artificial turf fiber) consists of the masterbatch and the rest consists of the compound polymer.

Depending on the embodiments, the UV-protection substances may be added to a masterbatch individually or as an already premixed UV-protection substance mixture. Alternatively, the UV-protection substances may be added to the final polymer mixture that is to be extruded individually or in the form of an already premixed UV-protection substance mixture or in the form of a masterbatch comprising said UV-protection substances.

A 'masterbatch' (MB) is a solid or liquid additive for plastic used for coloring plastics (color masterbatch) or imparting other properties to plastics (additive masterbatch). A masterbatch is a concentrated mixture of pigments and/or additives encapsulated during a heat process into a carrier resin which is then cooled and cut into a granular shape. Masterbatch allows the processor to color raw polymer economically during the plastics manufacturing process.

The master batch is typically mixed with one or more polymers (e.g., PE, PA and/or PP) to generate a fully compounded mixture. This fully compounded mixture is heated, cooled and granulated to form a compound batch. The compound batch can then be extruded into a film or a monofilament in a second step. The film or monofilament may be further processed for generating a fibrillated tape.

Alternatively, the fully compounded mixture can be extruded into the film or the monofilament directly in a continuous or discontinuous "1 step" approach. This "1 step" approach may have the advantage that the additional exposure of heat ("heat history") to both the polymers and the UV protection mixture for generating the compound batch is avoided. The final mixing of the components to be extruded can be performed in both approaches in the screw and extrusion part of an extrusion machine.

A "UV-absorbent substance" as used herein is a type of light stabilizer that functions by competing with the chromophores of the polymer material that is to be protected to absorb UV radiation. UV-absorbent substances change harmful UV radiation into harmless infrared radiation or heat that is dissipated through the polymer material.

A "UV-protection substance mixture", also referred to as "light stabilization substance mixture", "UV stabilization mixture" or "UV protection mixture", is a mixture of multiple substances that may be added to a polymer mixture for protecting the product made from the polymer mixture against UV irradiation and other types of photo-induced degradation.

BRIEF DESCRIPTION OF THE DRAWINGS

In the following, embodiments of the invention are explained in greater detail, by way of example only, making reference to the drawings in which.

DETAILED DESCRIPTION

Like-numbered elements in these figures are either equivalent elements or perform the same function. Elements which have been discussed previously will not necessarily be discussed in later figures if the function is equivalent.

Figure 1:
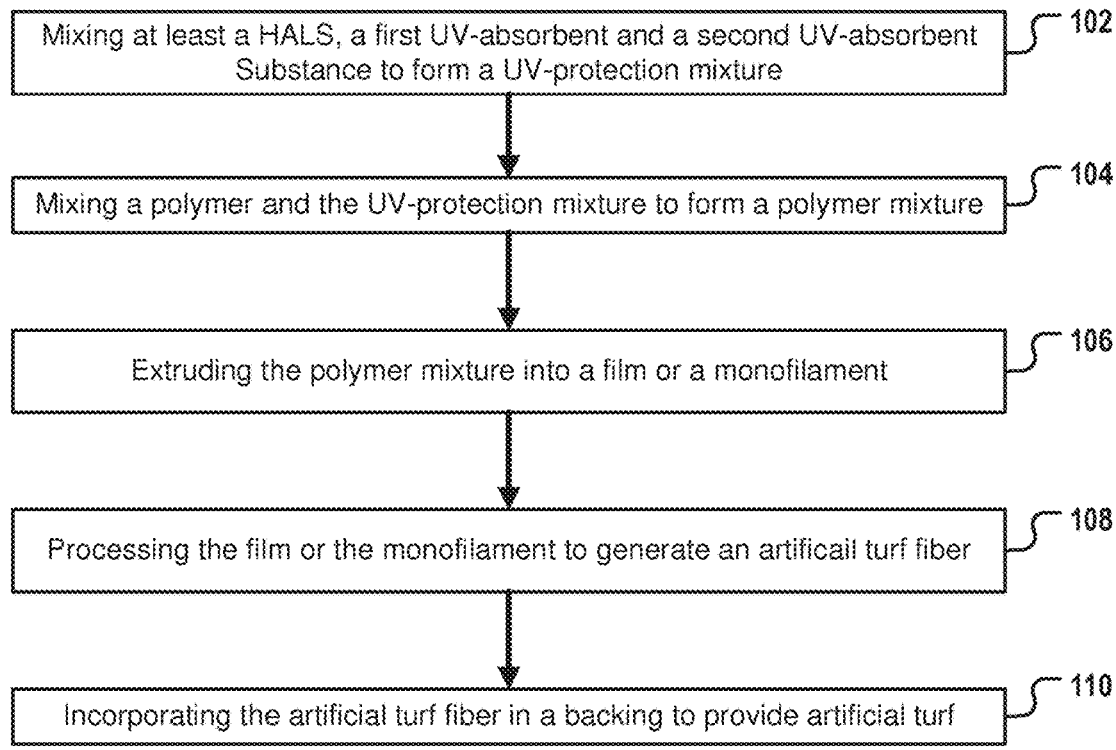
FIG. 1 shows a flowchart which illustrates an example of a method of manufacturing a UV protection substance mixture and an artificial turf comprising UV resistant fibers.

FIG. 1 shows a flowchart which illustrates an example of a method of manufacturing artificial turf comprising a long-term UV resistant fiber. The method will be described by making reference to the components of a UV protection substance mixture used for generating the polymer mixture depicted in FIG. 2.

First in step 102, one or more HALSs 204, a first UV absorbent substance 206 and a second UV absorbent substance 208 and, optionally, further substances like an organophosphite oxidant 210 are intermixed for creating a UV protection substance mixture 216.

Figure 2:
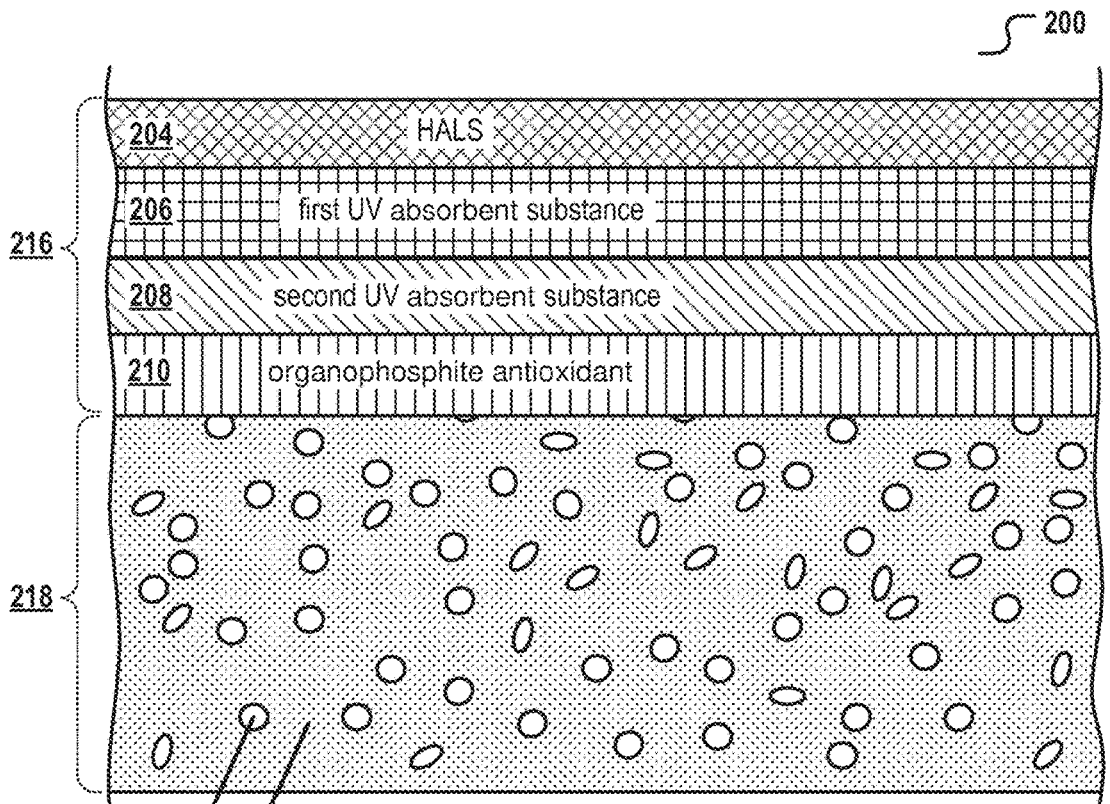
FIG. 2 shows the components of a polymer mixture including the individual components of the UV protection substance mixture.

The UV protection mixture may have the advantage that it can be added without further adaptation to a large number of different polymers or polymer compositions comprising different types and concentrations of polymer types and additives like softeners. This is because the effect of the HALS and the UV absorbent substances support, boost and complement each other in limiting photo induced polymer degradation, and because the different molecular weights of the first and second UV absorbent substances ensure that any depletion of the polymer material at the surface is compensated by UV absorbents migrating from inner regions of the polymer material to the outer regions where UV protection is required the most. The UV protection mixture is mixed thoroughly and may have granular or powder form. The individual components of the UV protection mixture 216 are depicted in FIG. 2 separately for illustrative purposes only.

In some embodiments, the UV-protection substance mixture is added to a master batch in an amount that ensures that the compound polymer to be generated from the master batch comprises the desired amounts of each of the UV-protection substances.

Next in step 104, the UV protection substance mixture (or the masterbatch comprising the UV protection substances) is mixed with one or more polymers 218, e.g. PE, PA, PP, or a mixture thereof. In the example depicted in FIG. 2, the polymer comprises a bulk polymer 214, e.g. PE, and droplets (beads) of a different polymer, e.g. PA. The PA droplets may be emulsified in the bulk polymer when both polymers are heated above their melding points. The UV protection mixture may be mixed with the one or more polymers when the polymers 212, 214 are in solid, granular form, or may be added to the liquid emulsion of the two polymers 212, 214. In some examples, the UV protection mixture is mixed into a master batch first and the master batch is then mixed with the polymers 212, 214. In other embodiments, the UV protection mixture is directly mixed into the complete polymer composition that is to be extruded into a monofilament or a film. According to some examples, the bead polymer is a polar polymer while the bulk polymer is an apolar polymer. Optionally, the polymer 218 may comprise a compatibilizer to stabilize the beads of the bead polymer within the bulk polymer. Steps 102 and 104 may also be performed in a single step by mixing all UV-protection substances and the polyol in a single step.

According to some embodiments, the polymer fraction 218 in addition comprises additional polymers that are also immiscible with the bulk polymer 214 and/or further additives, e.g. pigments, flame retardants, and the like.

The complete polymer mixture 200 is then thoroughly stirred and mixed to achieve a homogeneous distribution of all components of the polymer mixture. The mixing is typically performed at high temperatures to ensure that all polymers 212, 214 are in liquid phase and can be homogeneously mixed, whereby the emulsion of the stabilizing polymer in the bulk polymer is maintained.

In the next step 106, the mixture 200 is extruded into a monofilament or a film.

In step 108, the monofilament or film is further processed for generating an artificial turf fiber. For example, the monofilament can be further processed for generating a monofilament or monofilament assembly that can be used as an artificial grass fiber. The film can be further processed to form tent or truck tarps or other sheet-like plastic material. The film can also be split into slices that are further processed for generating artificial turf fibers. The extrusion process may stretch the stabilizing polymer beads, if any, into threadlike regions which increase the resilience of the generated monofilaments.

For example, the processing of a monofilament can comprise quenching or rapidly cooling the extruded monofilament. Then, the cooled monofilament is reheated and the reheated monofilament is stretched. This causes the molecules of the stabilizing polymer to become aligned with each other in the direction that the fibers are stretched. The stretching deforms the polymer beads into thread-like regions.

Additional steps may also be performed on the monofilament to form the artificial turf fiber. For instance, the film can be processed for generating a fibrillated tape and/or the fibrillated tape or the monofilament may be spun or woven into a yarn with desired properties.

Finally, the stretched monofilament is formed into the artificial turf fiber that may be integrated in a backing to form the artificial turf.

The integration of the fiber can comprise, but is not limited to, tufting or weaving the artificial turf fiber into a carrier and applying a liquid backing, e.g. a PU or latex backing, on the lower side of the carrier such that at least portions of the artificial turf fibers are surrounded by the artificial turf backing. According to other embodiments, the artificial turf fibers may be glued or held in place by a coating or other material.

By stating that the stabilizing polymer and the bulk polymer are immiscible, it is meant that the stabilizing polymer is immiscible with at least a majority of the components that make up the bulk polymer. For example, the bulk polymer could be made of one polymer that is immiscible with the stabilizing polymer and then have a smaller portion of the bulk polymer made from a second polymer that is or may be at least partially immiscible with the stabilizing polymer.

According to embodiments, the polymer mixture 200 to be extruded and to form the polymer material is a combination of a mixture or blend of polymers of different types, e.g., of polar polymers (e.g., PA) and apolar polymers (e.g., PE). The bulk polymer can be an non-polar polymer or a combination of both polar and non-polar polymers. The bulk polymer may have a compatibilizer to enable the non-polar and polar polymers to be mixed. In the case where the bulk polymer is made of a mixture of non-polar and polar polymers, the majority of the bulk polymer by weight is non-polar, e.g., PE-based. In another embodiment, the bulk polymer comprises any one of the following: a non-polar polymer, a polyolefin polymer, a thermoplastic polyolefin polymer, a polyethylene polymer, a polypropylene polymer, a polyamide polymer, a polyethylene polymer blend, and mixtures thereof.

In another embodiment, the polymer bulk comprises a first polymer, a second polymer, and the compatibilizer. The first polymer and the second polymer are immiscible. The first polymer forms polymer beads surrounded by the compatibilizer within the second polymer. The terms 'polymer bead' and 'beads' may refer to a localized region, such as a droplet, of a polymer that is immiscible in the second polymer. The polymer beads may in some instances be round or spherical or oval-shaped, but they may also be irregularly shaped. In some instances, the polymer bead will typically have a size of approximately 0.1 to 3 micrometers, preferably 1 to 2 micrometers in diameter. In other examples, the polymer beads will be larger. They may, for instance, have a size with a diameter of a maximum of 50 micrometers.

In one embodiment, the polymer bulk by weight comprises more second polymer than first polymer.

In another embodiment, the second polymer is a non-polar polymer and the first polymer is a polar polymer. This embodiment may be beneficial because it may provide a way of tailoring the texture and feel of the monofilaments used to make the artificial turf.

In another embodiment, stretching the reheated monofilament deforms the polymer beads into thread-like regions. In this embodiment, the stretching of the monofilament not only aligns the PA fibers but also stretches the polymer beads into thread-like regions which may also aid in changing the structure of the monofilament.

According to embodiments, the thread-like regions generated by the extrusion and stretching steps can have a diameter of less than 20 micrometers, in some embodiments less than 10 micrometers. In another embodiment, the thread-like regions have a diameter of between 1 and 3 micrometers. In another embodiment, the artificial turf fiber extends a predetermined length beyond the artificial turf backing. The thread-like regions have a length less than one half of the predetermined length. In another embodiment, the thread-like regions have a length of less than 2 mm.

FIG. 2 shows a polymer mixture 200 generated by mixing one or more polymers 212, 214, optional additives like pigments, flame retardants and the like (not shown), and a UV-protection mixture 216 with each other. The individual components of the UV-protection substance mixture 216 are homogeneously mixed with each other and with the polymer 212, 214 and depicted separately in FIG. 2 merely for illustration. The polymer mixture 200 can be extruded to form a monofilament. One or more of the monofilaments can be used as an artificial turf fiber.

Depending on the embodiments, the substances 204, 206, 208, 210 may be added to the final polymer mixture that is to be extruded individually or in the form of an already premixed UV-protection substance mixture.

Figure 5:
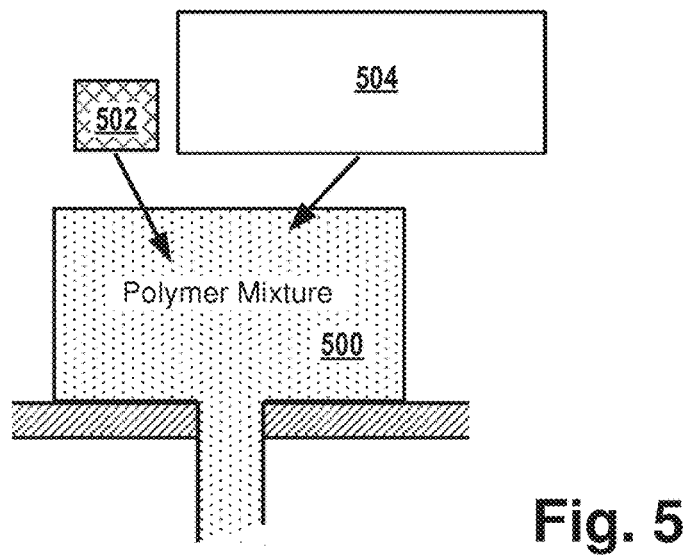
FIG. 5 shows the creation of a polymer mixture using a masterbatch.

Alternatively, the UV-protection substances 204, 206, 208, 210 can be added to a masterbatch individually or as an already premixed UV-protection substance mixture, and the masterbatch can be mixed with the pure polymer(s) optionally comprising a compatibilizer for generating the polymer mixture to be extruded as depicted in FIG. 5.

The polymer mixture is separated into different components for illustrations only. In fact, the share of the UV-protection substances in the extruded polymer mixture is much smaller.

Figure 3:
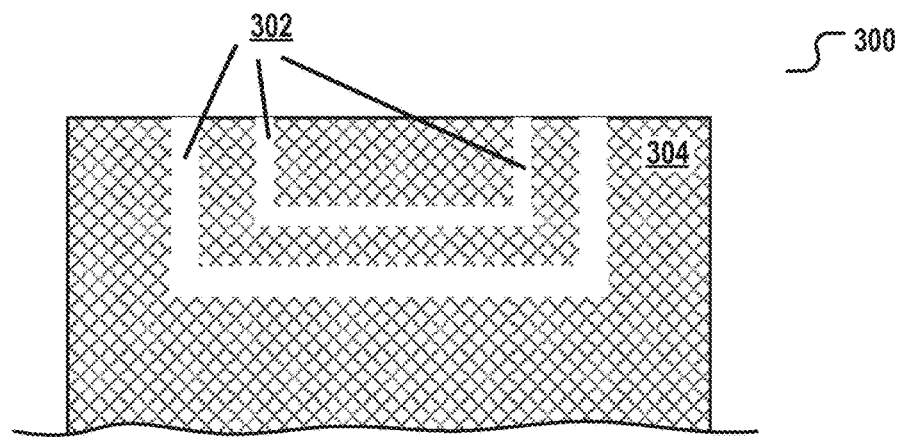
FIG. 3 shows a sports field comprising a mixture of first fibers and second fibers.

FIG. 3 shows a sports field made of an artificial turf comprising a mixture of first fibers and second fibers. The first fibers 302 comprise TiO2 used as a white pigment and constitute the fibers of the line markings. The second fibers 304 are free of the white pigment, they comprise a green pigment instead which does not boost photocatalytic degradation. The fibers 302, 304 of the artificial turf 300 show a homogeneous distribution of UV stability for all fiber types, because the first fibers 302 comprise the UV-protection substances while the second fibers 304 are either free of the UV-protection substances or comprise some or all of them in a significantly smaller amount.

Figure 4:
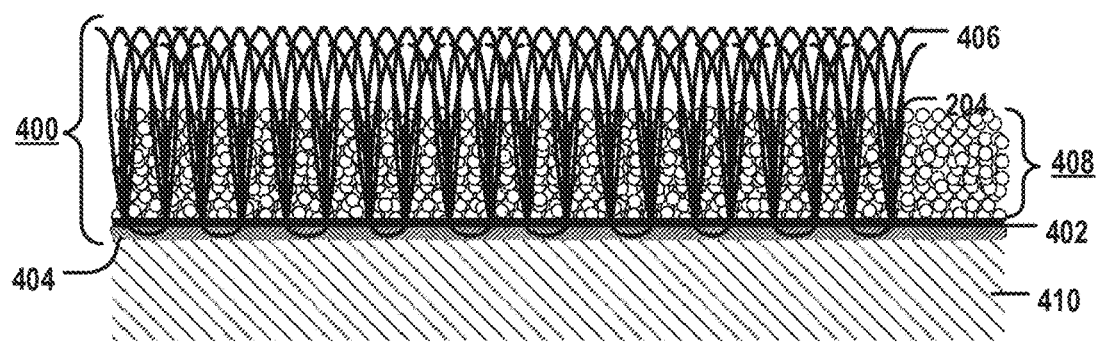
FIG. 4 shows artificial turf.

FIG. 4 shows artificial turf 400 comprising artificial turf fibers 406 having been tufted into a carrier structure 402. The artificial turf fibers are firmly fixed into the carrier structure by a backing layer 404 made of polyurethane or latex that is applied in liquid state onto the lower side of the carrier and that fixes the U-shaped fiber portions when the liquid backing hardens. The artificial turf further comprises infill granules 408, e.g. rubber granules comprising a plasticizer. The artificial turf is installed on a base layer 410, e.g. a concrete, stone, sand or clay layer.

FIG. 5 shows the creation of a polymer mixture 500 that is extruded through an extrusion nozzle. A masterbatch 502 comprising the UV-protection substances and optional further additives such as pigments and/or flame retardants is mixed with a pure polymer or pure polymer mixture 504. For example, the polymer 504 can be pure PE or a mixture of PE/PA or any other type of polymer. The polymer 504 is typically free of any additives. Typically, the masterbatch constitutes about 6-12% by weight of the polymer mixture 500 that is finally extruded into the artificial turf fiber, the rest of the mixture 500 consists of the polyol 504.

According to some embodiments, the polymer mixture 200 is created by combining 6% of the masterbatch 502 and 94% of the polyol 504. According to other embodiments, the polymer mixture 200 is created by combining 10% of the masterbatch 502 and 90% of the polyol 504.

The masterbatch 502 is adapted for producing an artificial turf fiber 406 as shown, for example, in FIG. 4. The masterbatch comprises a polyol (typically of the same type as the polyol component 504) and substances 216 adapted for protecting the fiber against UV radiation. The substances comprise a hindered amine light stabilizer—HALS 204, a first UV-absorbent substance 206, and a second UV-absorbent substance 208. The molecular weights of the first and the second UV-absorbent substances differ from each other by at least 100 g/mol.

According to an embodiment, the master batch comprises
at least 4%, more preferably at least 6%, more preferably at least 8% by its weight the HALS; and/or
at least 0.5%, more preferably at least 1%, more preferably at least 2% by its weight the first UV-absorbent substance; and/or
at least 0.1%, more preferably at least 0.5%, more preferably at least 1.5% by its weight the second UV-absorbent substance; and/or
at least 0.1%, more preferably at least 0.5%, more preferably at least 1.5% by its weight the organophosphite antioxidant.

LIST OF REFERENCE NUMERAL 102-110 steps
200 polymer mixture
204 HALS
206 first UV absorbent substance
208 second UV absorbent substance
210 organophosphite antioxidant
212 bulk polymer (PE)
214 polyamide (PA) beads
216 UV protection mixture
218 Polymer (PE/PA polymer emulsion)
300 sports field made of artificial turf
302 first fibers comprising TiO2
304 second fibers being free of TiO2
400 artificial turf
402 carrier structure
404 backing
406 artificial turf fiber
408 infill granules
410 base layer
500 polymer mixture
502 masterbatch
504 (pure) polymer(s)

The invention claimed is:

1. A polymer-based artificial turf fiber comprising substances adapted for protecting the fiber against UV radiation, the substances comprising:
   a hindered amine light stabilizer (HALS); and
   two sterically hindered phenolic antioxidants,
      a first sterically hindered phenolic antioxidant UV-absorbent substance having a molecular weight smaller than 600 g/mol, and
      a second sterically hindered phenolic antioxidant UV-absorbent substance having a molecular weight higher than 800 g/mol, wherein
      the fiber comprises the first UV-absorbent substance by at least 0.05% of a weight of the fiber and the second UV-absorbent substance by at least 0.01% of the weight of the fiber, and
      wherein the HALS is 1,3-propanediamine, N,N-1,2-ethanediylbis-, reaction products with cyclohexane and peroxidized N-butyl-2,2,6,6-tetramethyl-4-piperidinamine -2,4,6-trichloro-1,3,5-triazine reaction products.

2. The artificial turf fiber according to claim 1, further comprising an organophosphite antioxidant.

3. The artificial turf fiber according to claim 2, wherein the organophosphite antioxidant is tris(2,4-ditert-butylphenyl)phosphite.

4. The artificial turf fiber according to claim 1, wherein the artificial turf fiber comprises an organophosphite antioxidant by at least 0.01% of the fiber's weight.

5. The artificial turf fiber according to claim 1, wherein the artificial turf fiber comprises the HALS by at least 0.4% of the weight of the fiber.

6. The artificial turf fiber according to claim 1, further comprising a booster of photocatalytic degradation of a polymer material of the fiber, the booster being a metal salt or metal oxide.

7. The artificial turf fiber according to claim 6, wherein the booster is $TiO_2$.

8. An artificial turf comprising the polymer-based artificial turf fibers according to claim 1.

9. The artificial turf according to claim 8, comprising: a booster of photocatalytic degradation, wherein the booster is a metal salt or metal oxide, and wherein the booster of photocatalytic degradation includes a first pigment having a white or bright color; second artificial turf fibers and/or third artificial turf fibers, wherein the second artificial turf fibers are free of the first pigment and comprise at least 10% less of each of the first and second sterically hindered phenolic antioxidants than the first artificial turf fiber, wherein the third artificial turf fibers are free of the first pigment and are free of one or more of the first and second sterically hindered phenolic antioxidants.

10. The artificial turf according to claim 8, further comprising rubber infill, the rubber comprising a plasticizer.

11. A method of producing an artificial turf fiber comprising:
   creating a polymer mixture, the creation comprising mixing a polymer-based polymer and substances adapted for protecting the fibers against UV radiation, the substances according to claim 1, comprising:
   extruding the polymer mixture into a polymer film or into a monofilament; and
   processing the film or the monofilament for transforming the film or the monofilament into the artificial turf fiber.

12. The method of claim 11, further comprising:
   integrating first artificial turf fibers in the carrier, the first artificial turf fibers comprising a booster of photocatalytic degradation, the booster of photocatalytic degradation being in particular a metal salt or metal oxide, the booster of photocatalytic degradation being a first pigment having a white or bright color;
   integrating second artificial turf fibers and/or third artificial turf fibers in the carrier, the second artificial turf fibers being free of the first pigment, the second artificial turf fibers comprising at least 10% less of each of the first and second sterically hindered phenolic antioxidants than the first artificial turf fibers, the third artificial turf fibers being free of the first pigment and being free of one or more or the first and second sterically hindered phenolic antioxidants.

13. A masterbatch adapted for producing an artificial turf fiber, the masterbatch comprising a polyol and substances adapted for protecting the fiber against UV radiation according to claim 1.

14. The artificial turf fiber according to claim 1, wherein the first sterically hindered phenolic antioxidant is octadecyl-3-(3,5-di-tert.butyl-4-hydroxyphenyl)-propionate.

* * * * *